Patented Sept. 13, 1949

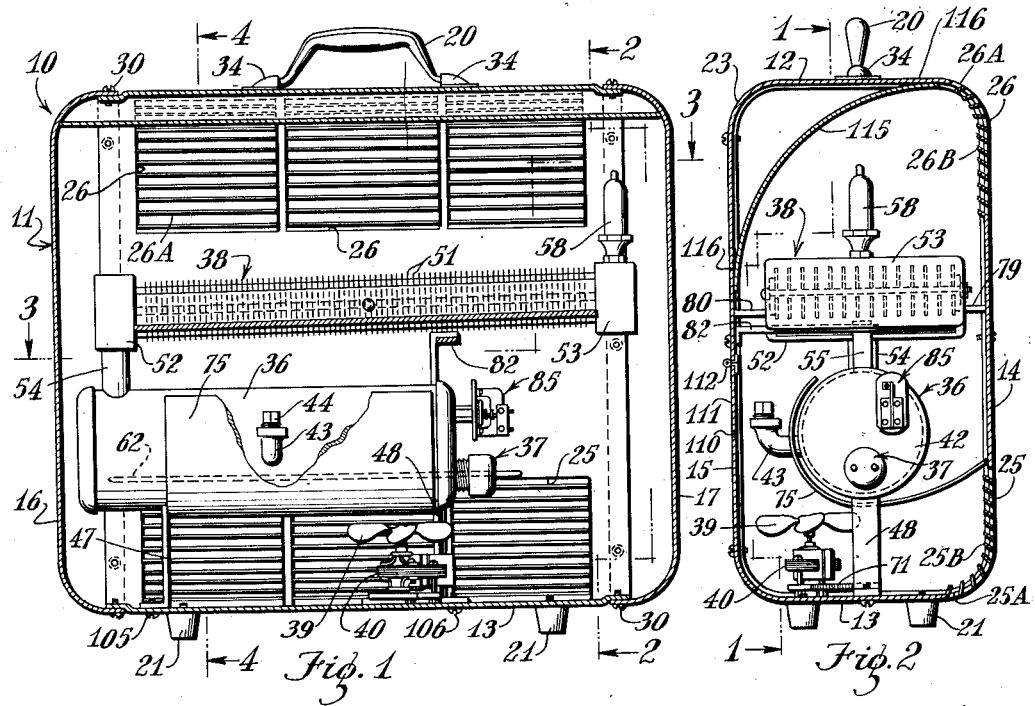
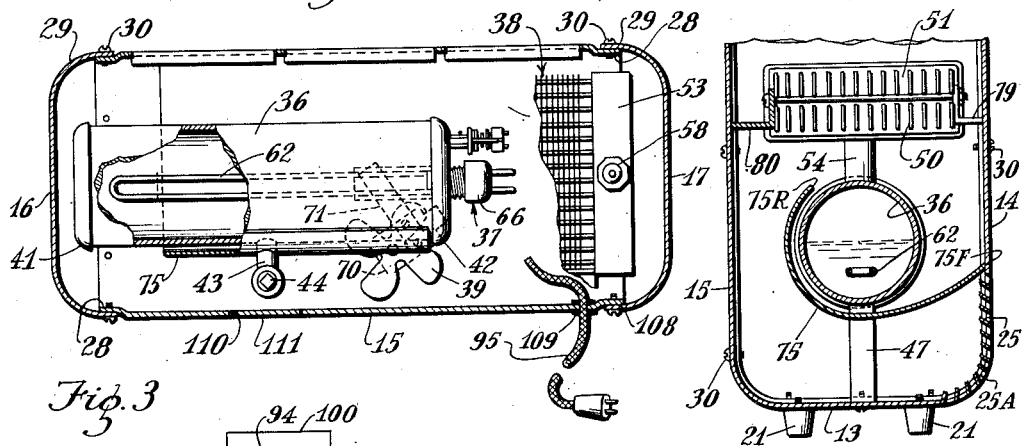
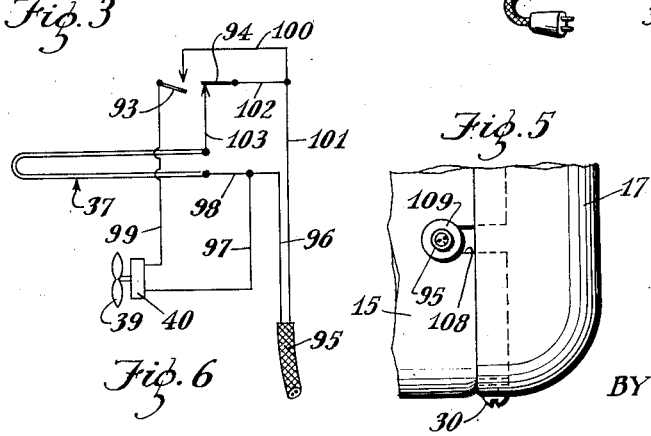

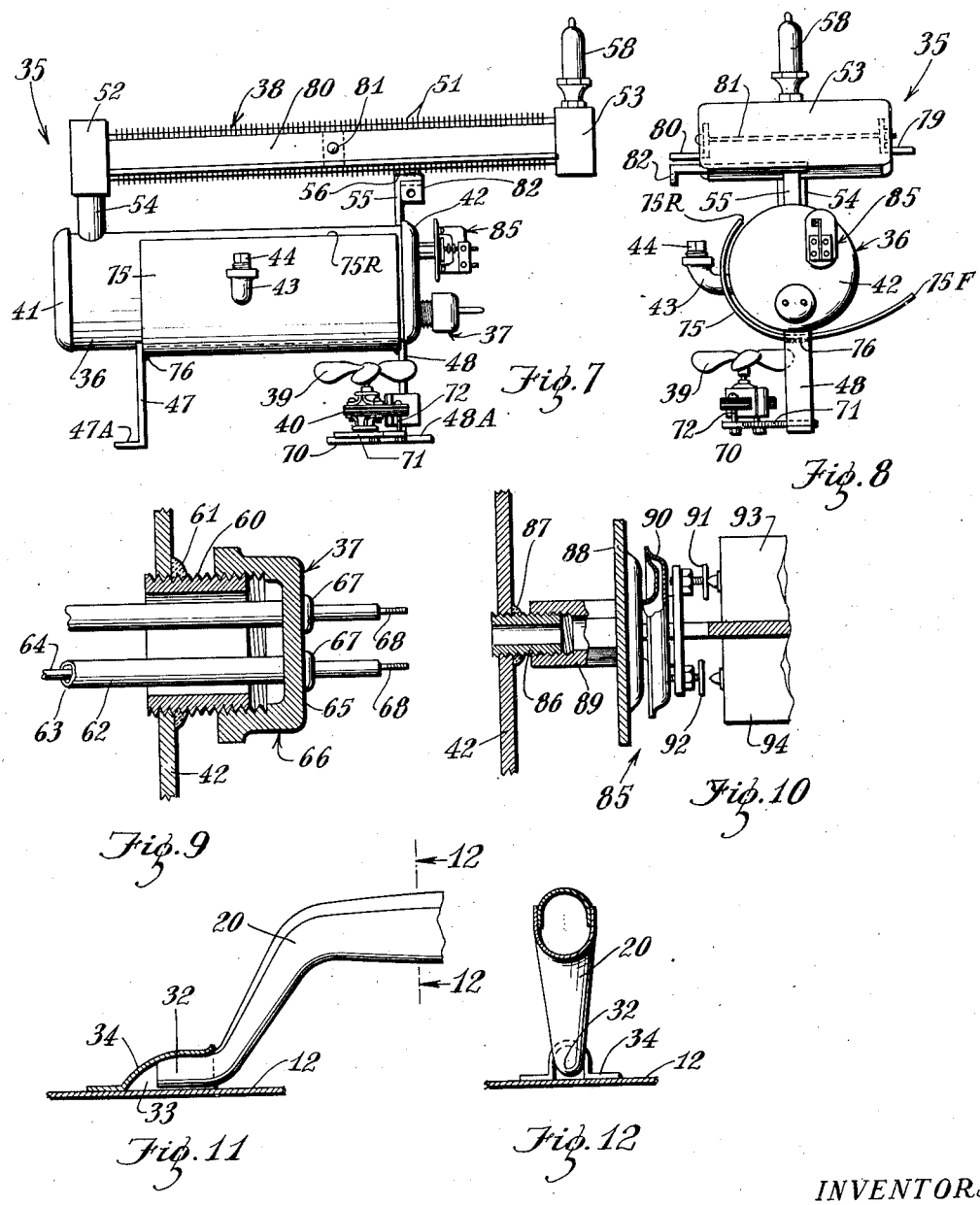

2,481,963

UNITED STATES PATENT OFFICE 2,481,963

ELECTRICALLY HEATED FAN-RADIATOR APPARATUS

Samuel A. Witte, William W. Wittie, Philip W. Wittie, and Nicholas Witte, Chicago, Ill.

Application February 27, 1946, Serial No. 650,532

10 Claims. (Cl. 219—39)

The present invention relates to heating apparatus and particularly to portable space heaters adapted for room heating purposes.

While there have been in the past many portable heating devices adapted for room heating purposes, such prior heaters have been in most instances relatively heavy or difficult to handle and transport, and to avoid such difficulties and afford a heating element that is readily portable is the primary object of this invention. Another and related object of the present invention is to enable an electrically heated steam heating apparatus to be embodied in portable form for use as a room heater. A further object is to enable the operating elements of such a heating apparatus to be readily assembled as a unit so that such unit may be then incorporated within a casing which encloses the unit and cooperates with the heating elements to provide the desired circulation of heated air. More specifically, it is an object of the present invention to enable the heating action of such an electrically heated steam heating apparatus to be effectively controlled so as to obtain high operating efficiency, and another and related object is to so construct and relate the elements of such an apparatus that these elements may be readily manufactured as well as repaired.

Other and further objects of the present invention will be apparent from the following description and claims and are illustrated in the accompanying drawings which, by way of illustration shows a preferred embodiment and the principle thereof and what we now consider to be the best mode in which we have contemplated applying that principle. Other embodiments of the invention embodying the same or equivalent principles may be used and structural changes may be made as desired by those skilled in the art without departing from the present invention and the purview of the appended claims.

In the drawings:

Fig. 1 is a vertical sectional view of a heating device embodying the features of the invention, the view being taken substantially along the line 1—1 of Fig. 2;

Fig. 2 is a transverse sectional view taken substantially along the line 2—2 of Fig. 1;

Fig. 3 is a horizontal sectional view taken substantially along the line 3—3 of Fig. 1;

Fig. 4 is a fragmental vertical sectional view taken substantially along the line 4—4 of Fig. 1;

Fig. 5 is a fragmental rear elevational view;

Fig. 6 is a schematic wiring diagram;

Fig. 7 is a side elevational view of the heating and air circulating unit of the present device;

Fig. 8 is an end elevational view of the heating and air circulating unit;

Fig. 9 is a fragmental sectional view showing the manner in which the heating element is constructed and mounted;

Fig. 10 is a fragmental sectional view showing the manner in which the switches are mounted and controlled;

Fig. 11 is a fragmental sectional view of the handle construction; and

Fig. 12 is a sectional view of the handle taken along the line 12—12 of Fig. 11.

In the form chosen for disclosure herein, the invention is embodied in a portable space heater 10 that has the operative heating and air circulating elements included within a casing 11 that is formed from sheet metal to afford a top wall 12, a bottom wall 13, a front wall 14, a rear wall 15 and detachably associated end walls 16 and 17. The arrangement of the walls of the casing 11 is such that this casing takes the general form of a travelling bag or suitcase, and a handle 20 is mounted on the upper wall 12 of the casing in a manner that will be described in greater detail hereinafter. The lower or bottom wall 13 of the casing has feet 21 mounted thereon so that the casing 11 will be supported somewhat above the floor level.

The heating and air circulating elements of the space heater of the present invention are all included within the chamber afforded by the several walls of the casing 11, and in forming the casing 11, the various elements of the casing are constructed and related so as not only to facilitate manufacturing and assembly of the casing itself but also to facilitate the mounting of the heating and air circulating elements within the casing. Thus in the production of the casing 11, the top and bottom walls 12 and 13 and the front and back walls 14 and 15 are formed from a single sheet of metal that is bent to afford rounded corners as at 23, Fig. 2, and the ends of the sheet are preferably joined together as by welding. The sheet metal that is thus utilized in forming the main section of the casing is so formed as to afford an inlet opening 25 and an outlet opening 26, and in the present instance both the inlet opening and the outlet opening are afforded primarily in the forward wall 13 of the casing. It will be observed, however, that the lower end of the inlet opening 25 is extended downwardly as at 25A, Fig. 2, about the rounded lower corners of this section of the casing, and the outlet opening 26 is extended upwardly as at 26A throughout substantially the entire extent of the rounded upper corner that connects the forward wall 13 of the upper wall 12. Preferably the inlet and outlet openings 25 and 26 are formed as louvers which have vanes or slats 25B and 26B that are formed by processes of stamping from the metal of the sheet from which this unit of the casing is made.

The end edges or marginal portions of the center or main section of the casing are offset inwardly as at 28, Figs. 1 and 3, so as to facilitate association of the end walls 16 and 17 therewith, these end walls 16 and 17 being formed or drawn so as to have rounded corners and edges that afford attachment flanges 29 that embrace the offset portions 28, as will be evident in Figs. 1 and 3, and means are extended through the flange portions 29 of the end walls and into the offset portions 28 so as to secure the end walls 16 and 17 in place. In the present instance such securing means are afforded by a plurality of self-tapping screws 30.

Since the present space heating device is intended to be carried from place to place by the handle 20, and since it is desirable that this handle be relatively cool, the handle 20 is associated with the upper wall 12 of the casing in such a manner as to minimize transfer of heat from the casing to the handle 20. In the present instance this is accomplished in the manner illustrated in Figs. 11 and 12 of the drawings where it will be evident that the handle 20 is made from sheet metal so as to afford coaxial extending ends 32 that are extended loosely into pockets 33 afforded by sheet metal bracket members 34 that are secured as by spot welding to the upper surface of the top wall 12. Because of the loose connection that is thus afforded, the transfer of the heat to the casing from the handle 20 is minimized and a rather cool handle for carrying the unit is thereby assured.

The heating and air circulating means of the space heater of the present invention are constructed as a unit, as shown in Figs. 7 and 8 of the drawings, so that this unit may be completely assembled and then may be inserted readily and easily into its operative position into the casing 11, such operative position being shown in Figs. 1 to 4 of the drawings. In enabling this to be accomplished, the end wall 17 is removed from the casing so as to leave this end of the casing open, and the heating and air circulating unit 35 is inserted endwise into position within the casing and is secured in position as will hereinafter be described, after which the end wall 17 is put into position on the casing.

The unit 35 comprises a steam boiler 36 having an electrical heating unit 37 associated therewith so that steam may be created in the boiler 36 and will be transmitted to a heat exchange element 38 that is mounted in association with the boiler, and an air circulating fan 39 driven by an electric motor 40, is also associated with the unit so as to circulate air past the heat exchange element 38. The boiler 36 is cylindrical in form, and has end caps 41 and 42 permanently associated with opposite ends thereof, and this boiler is of such a character that it may be formed from ordinary commercial pipe. The end caps 41 and 42 are preferably associated with the cylindrical element of the boiler by processes of welding; and a filling pipe 43 closed by a plug 44 is also associated with the cylindrical portion of the boiler 36, the filling pipe 43 being formed by a conventional elbow disposed in the present instance so as to have the plugged end extended in an upward direction. The boiler 36 has a pair of legs 47 and 48 secured thereto as by welding so as to thereby extend such legs downwardly from the boiler 36, and these legs have feet 47A and 48A formed thereon so that these feet are adapted to rest upon the bottom wall 13 of the casing.

The heat exchange element 38 is in the present instance afforded by a plurality of long narrow tubes 50 extended through a plurality of spaced transverse fins 51 and connected at their opposite ends to headers 52 and 53. The header 52 is connected to the boiler 36 by a pipe 54 that is disposed adjacent to the end cap 41, and a support 55 is extended upwardly from the boiler 36 adjacent to the end cap 42 so as to be disposed beneath the heat exchange element in a supporting relation. In the present instance the support 55 has a foot extended horizontally at the upper end thereof so that the lower edges of certain of the fins 51 rest on such foot, and these parts are secured together as by soldering at 56. The relationship between the pipe 54 and the support 55 is such that when the feet 47a and 48a are disposed on a horizontal surface, the tubes 50 of the heat exchange element will slope toward the header 52, thereby to return condensate to the boiler, but it will be understood that under some instances a return line from the header to the boiler might be provided in accordance with well known practice. The header 53 has a vent valve 58 of a conventional type associated therewith, this vent valve being of the type which closes when steam is present in the header 53.

The mounting of the electrical heater 37 in the boiler is accomplished under the present invention in such a manner that this heater may be readily removed for inspection or replacement. In accomplishing this result, a nipple 60 is connected to the end cap 42 as by threading the same through the end cap as shown in Fig. 9 of the drawing and the joint between these two elements is preferably sealed as by welding at 61. Thus an opening into the boiler 36 is afforded and the electrical heating element is provided by a water proof heating element of known construction as indicated at 62, this element constituting a water proof sheath 63 and an insulated heating wire 64 extended therethrough. The heating element 63 is bent into an elongated U-shaped form and the ends are extended through the end wall 65 of a conventional pipe cap 66. Exteriorly of the walls 65 the sheath 63 is sealed as by welding at 67, and terminals 68 are provided in an exposed relation for connection of the lower leads to opposite ends of the heating element. The heating element is inserted endwise through the nipple 60 and into the boiler 36, and the pipe cap 66 is threaded onto the nipple 60 so as to thereby seal the boiler 36 with the heating element in position within the boiler.

Under the present invention, provision is made for forced circulation of air through the casing of the space heater so that this air is drawn into the casing through the inlet 25 and is forced upwardly through the heat exchange unit 38 and then out through the outlet 26 of the casing. In providing for such forced circulation of the air, the fan 39 is mounted on the support 48 of the unit 35. Thus as will be evident in Figs. 7 and 8, a plate 70 is secured to one of the legs by means of a bracket 71 so as to extend in a horizontal direction toward the rear wall of the casing, as shown in Fig. 2, and connecting screws 72 are extended downwardly through mounting openings afforded in the field laminations of the motor 40 and into the plate 70. This positions the fan 39 so as to blow air upwardly past what may be termed the rear face of the boiler 36. In the present instance, however, this upwardly moving air is maintained out of contact with the boiler 36 and is directed toward the lower surface of the heat exchange unit 38. This is accomplished by an arcuate baffle plate 75 that is disposed between the two supports 47 and 48 in spaced relation to the boiler 36. The side edge portions of the baffle plate are welded as at 76 to the legs 47 and 48, and the plate 75 has a forward edge 75F that is, in the finished device, disposed closely adjacent to the forward wall 14 above the inlet opening 25 as will be evident in Fig. 2 of the drawing. The other or rear edge 75R of the baffle plate 75 is disposed adjacent to the upper edge of the boiler 36 as shown in Figs. 7 and 8, and the arrangement is such that when the unit 35 is in position in the casing, the baffle plate 75 will at all points be spaced substantially from the rear wall 15 of the casing so as to thereby afford a substantial air passage in an upwardly direction above the fan 39. Under some circumstances it may be desirable to assure that most of the air thus circulated by the fan 39 will pass through the heat exchange unit 38, and for this purpose a pair of baffle plates 79 and 80 may be secured along the side of the heat exchange unit. These baffle plates 79 and 80 are in the form of angle plates, one arm of which extends upwardly so as to be disposed against the adjacent end edge of the fins 51, and the two baffles 79 and 80 are secured in place by bolts 81 extended through the heat exchange unit between fins 51. In some instances, the members 79 and 80 may be relatively narrow so as to thereby act merely as positioning means for engagement with the walls 14 and 15 so as to thereby prevent tipping of the unit 35 within the casing. In other instances a bracket 82 may be fixed as by welding to the foot of the support 55, and may be extended to the rear wall 15 of the casing, to which it may be fixed as by means of a bolt or screw.

The heating and air circulating unit 35 also includes control means 85 that are responsive to boiler conditions for controlling the operation of the heater 37 and the fan 39. In the present instance such means are responsive to pressure within the boiler 36, and are mounted in the manner illustrated in Fig. 10 of the drawing. Thus a nipple 86 is threaded through the end cap 42 and is sealed in this position as by welding at 87. On the nipple 86 a control bracket 88 is secured by means of an internally threaded sleeve 89 and the sleeve 89 is arranged to transmit steam pressure from the boiler 36 into a bellows 90 which is also mounted on the bracket 88. The bellows 90 is thus extended or expanded by the steam pressure in the boiler 36, and this relative expansion of the bellows 90 is utilized to control the motor 39 and the heating element 37. Thus the bellows 90 has a pair of adjustable control plungers 91 and 92 mounted thereon, and these control plungers are aligned respectively with the operating plungers of a pair of micro-switches 93 and 94 that are also mounted on the bracket 88. The switch 93 is arranged to control the operation of the fan 39 and is of the normally open type as shown in Fig. 6 so as to be closed when the plunger thereof is engaged and operated by the adjustable plunger 91. The switch 94 is of the normally closed type as shown in Fig. 6 and this switch is arranged to be open by the action of the adjustable plunger 92. With this arrangement the electric power for the heater 37 and the fan 39 is supplied by a conventional cord 95, one wire 96 of which has branch leads 98 and 97 extended respectively to one terminal of the heater element 37 and to one terminal of the fan motor 40. The other terminal of the fan motor 40 is connected by a wire 99 to one contact of the switch 93, while a wire 100 is extended from the other terminal of the switch 93 to the other wire of the cord 95. A wire 102 connects the wire 101 to one contact of the switch 94, and the other contact of the switch 94 is connected by a wire 103 to the other end of the heating element 37. The adjustment of the abutment 91 is preferably such that the fan switch 93 will be closed when the steam pressure in the boiler reaches approximately three pounds, while the adjustment of the abutment 92 is preferably such that when the steam pressure in the boiler reaches approximately ten pounds, the heat switch 94 will be opened, and when the boiler pressure is reduced somewhat below ten pounds, this switch will again be closed.

When the unit 35 has thus been assembled, it is moved endwise to the casing 11 and the feet 47a and 48a are secured to the bottom wall 13 of the casing by means such as self-tapping screws 105 and 106. In the course of such movement of the unit 35 into the casing 11, the electric cord 95 is moved into a slot 108, Figs. 3 and 5, that is formed in the adjacent end of the rear wall 15 of the casing. The cord 95 may, if desired, be protected by a resilient grommet 109 which is of course disposed upon the cord 95 before the other connections of the cord have been made. Thus the unit 35 may readily be placed in position within the casing 11, and after this has been done the end wall 17 may be secured in position in the manner hereinbefore described. When the unit 35 is in position in the casing 11, the filling opening 43 is disposed, as shown in Figs. 2 and 3, so as to be directly opposite an access opening or door 110, this opening 110 being adapted for closure by a disc-like door member 111 that is in the present instance pivotally supported by a hinge 112 so as to be adapted to be moved in an open position when it is desired to fill the boiler 36.

The fan 39 serves of course to force air upwardly through the casing, such air being drawn into the casing through the inlet 25, and this air is circulated upwardly through the heat exchange unit 38 and outwardly through the outlet opening 26, and there will of course be some circulation due to the circulating action of the heat exchange unit 38, but the present invention, through the use of the fan 39, provides greater heating efficiency than would be otherwise possible. Through the provision of an arcuate baffle 115, that is secured as by welding at 116 to the rear wall 15 and the top wall 12 of the casing, the movement of air through the casing 11 is facilitated, and the relationship of the baffle or deflector 115 is such that the upwardly moving air is directed forwardly toward the outlet opening 26. Thus the present heater affords a forwardly directed stream of heated air that is discharged from the outlet 26, and because of this the present space heater is particularly adapted for room heating purposes.

From the foregoing description it will be apparent that the present invention provides a highly efficient and convenient space heater that is readily portable in character. This space heater is highly efficient and effective for room heating purposes and is so constructed and arranged so as to be capable of efficient and economical manufacture as well as convenient repair or inspection. Thus while we have illustrated and described the preferred embodiment of our invention, it is to be understood that this is capable of variation and modification and we therefore do not wish to be limited to the precise details set forth, but desire to avail ourselves of such changes and alterations as fall within the purview of the following claims.

We claim:

1. In a space heater a heating unit comprising a steam boiler, an electrical heating element operatively associated with said boiler, a heat exchange element operatively connected with and supported by said boiler, supporting legs for said boiler extending downwardly therefrom, an electrically operated circulating fan mounted on and carried by one of said legs, baffle means carried by said legs and extended beneath at least a portion of said boiler, a pressure responsive actuator carried by and operatively associated with said boiler, a pair of adjustable switch operating members carried by said pressure responsive actuator, a pair of switches carried by said actuator and operatively related to the respective operating members, and means affording energizing circuits for said fan and said heating element including said switches in parallel, a casing having inlet and outlet openings formed therein and having at least one removable wall, said heating unit being movable into or out of said casing when said wall is removed, and means securing said unit in position within said casing.

2. In a space heater, a heating unit comprising a steam boiler, an electrical heating element operatively associated with said boiler, a heat exchange element operatively connected with and supported by said boiler, supporting legs for said boiler extending downwardly therefrom, an electrically operated circulating fan mounted on and carried by one of said legs, baffle means carried by said legs and extended beneath at least a portion of said boiler, a pressure responsive actuator carried by and operatively associated with said boiler, a pair of adjustable switch operating members carried by said pressure responsive actuator, a pair of switches carried by said actuator and operatively related to the respective operating members, and means affording energizing circuits for said fan and said heating element including said switches in parallel.

3. In a space heater, a heating unit comprising a steam boiler, an electrical heating element operatively associated with said boiler, a heat exchange element operatively connected with and supported by said boiler, supporting legs for said boiler extending downwardly therefrom, an electrically operated circulating fan mounted on and carried by one of said legs, an actuator responsive to boiler conditions and carried by and operatively associated with said boiler, a pair of adjustable switch operating members carried by said actuator, a pair of switches operatively related to the respective operating members, and means affording energizing circuits for said fan and said heating element including said switches.

4. In a space heater, a heating unit comprising a steam boiler, an electrical heating element operatively associated with said boiler, a heat exchange element operatively connected with and supported by said boiler, supporting legs for said boiler extending downwardly therefrom, an electrically operated circulating fan mounted on and carried by one of said legs, an actuator responsive to boiler conditions and carried by and operatively associated with said boiler, a pair of adjustable switch operating members carried by said actuator, a pair of switches operatively related to the respective operating members, and means affording energizing circuits for said fan and said heating element including said switches in parallel, a casing having inlet and outlet openings formed therein and having at least one removable wall, said heating unit being movable into or out of said casing when said wall is removed, and means securing said unit in position within said casing.

5. In a space heater, a heating unit comprising a steam boiler, an electrical heating element operatively associated with said boiler, a heat exchange element operatively connected with and supported by said boiler, supporting legs for said boiler extending downwardly therefrom, an electrically operated circulating fan mounted on and carried by one of said legs, an actuator responsive to boiler conditions and carried by and operatively associated with said boiler, a pair of adjustable switch operating members carried by said actuator, a pair of switches operatively related to the respective operating members, and means affording energizing circuits for said fan and said heating element including said switches, a casing having inlet and outlet openings formed therein and means securing said unit in position within said casing.

6. In a space heater, a heating unit comprising a steam boiler, an electrical heating element operatively associated with said boiler, a heat exchange element operatively connected with and supported by said boiler, supporting legs for said boiler extending downwardly therefrom, an electrically operated circulating fan mounted in fixed relation to said boiler, an actuator responsive to boiler conditions and carried by and operatively associated with said boiler, a pair of adjustable switch operating members associated with said actuator, a pair of switches operatively related to the respective operating members, and means affording energizing circuits for said fan and said heating element including said switches.

7. In a space heater, a heating unit comprising a steam boiler, an electrical heating element operatively associated with said boiler, a heat exchange element operatively connected with and supported by said boiler, supporting legs for said boiler extending downwardly therefrom, baffle means carried by said legs and extended beneath at least a portion of said boiler, a pressure responsive actuator carried by and operatively associated with said boiler, a pair of adjustable switch operating members carried by said pressure responsive actuator, a pair of switches carried by said actuator and operatively related to the respective operating members, and means affording a pair of energizing circuits one of which extends to said heating element, said last mentioned means including said switches in parallel.

8. In a space heater, a casing having inlet and outlet openings formed therein and having at least one removable wall, a heating unit comprising a steam boiler, an electrical heating element operatively associated with said boiler, a heat exchange element operatively connected with and supported by said boiler, supporting legs for said boiler extending downwardly therefrom, an electrically operated circulating fan in said casing, baffle means carried by said legs and extended beneath at least a portion of said boiler, a pressure responsive actuator carried by and operatively associated with said boiler, a pair of adjustable switch operating members carried by said pressure responsive actuator, a pair of switches carried by said actuator and operatively related to the respective operating members, and means affording energizing circuits for said fan and said heating element including said switches in parallel, said heating unit being movable into or out of said casing when said wall is removed, and means securing said unit in position within said casing.

9. In a space heater, a casing having inlet and outlet openings formed therein and having at least one removable wall, a heating unit comprising a steam boiler, an electrical heating element operatively associated with said boiler, a heat exchange element operatively connected with and supported by said boiler, supporting legs for said boiler extending downwardly therefrom, an electrically operated circulating fan in said casing, an actuator responsive to boiler conditions and carried by and operatively associated with said boiler, a pair of adjustable switch operating members carried by said actuator, a pair of switches operatively related to the respective operating members, and means affording energizing circuits for said fan and said heating element including said switches in parallel, said heating unit being movable into or out of said casing when said wall is removed, and means securing said unit in position within said casing.

10. In a space heater, a casing having inlet and outlet openings formed therein and having at least one removable wall, a heating unit comprising a steam boiler, an electrical heating element operatively associated with said boiler, a heat exchange element operatively connected with and supported by said boiler, supporting legs for said boiler extending downwardly therefrom, an electrically operated circulating fan in said casing, baffle means for directing air from said inlet opening toward said outlet opening, means associated with said boiler and responsive to boiler conditions, a switch operated by said means, and an energizing circuit for said heating element controlled by said switch means.

SAMUEL A. WITTE.
WILLIAM W. WITTIE.
PHILIP W. WITTIE.
NICHOLAS WITTE.

REFERENCES CITED

The following references are of record in the file of this patent:

UNITED STATES PATENTS

| Number | Name | Date |
|---|---|---|
| 1,053,552 | Barr | Feb. 18, 1913 |
| 1,767,082 | Lake | June 24, 1930 |
| 1,848,716 | Hart et al. | Mar. 8, 1932 |
| 1,938,833 | Irons, Sr. | Dec. 12, 1933 |
| 1,986,350 | Logan | Jan. 1, 1935 |
| 2,030,316 | Opitz | Feb. 11, 1936 |
| 2,151,140 | Novak | Mar. 21, 1939 |
| 2,257,342 | Lintern | Sept. 30, 1941 |
| 2,360,071 | Noll | Oct. 10, 1944 |